(12) United States Patent
Mochizuki

(10) Patent No.: US 8,824,025 B2
(45) Date of Patent: Sep. 2, 2014

(54) IMAGE INFORMATION REGISTRATION SYSTEM, NON-TRANSITORY COMPUTER READABLE MEDIUM STORING AN IMAGE INFORMATION REGISTRATION PROGRAM, AND IMAGE INFORMATION REGISTRATION METHOD

(71) Applicant: Fuji Xerox Co., Ltd., Tokyo (JP)

(72) Inventor: Junya Mochizuki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 148 days.

(21) Appl. No.: 13/630,766

(22) Filed: Sep. 28, 2012

(65) Prior Publication Data

US 2013/0250375 A1 Sep. 26, 2013

(30) Foreign Application Priority Data

Mar. 21, 2012 (JP) ................................. 2012-064218

(51) Int. Cl.
*H04N 1/04* (2006.01)
*G06K 9/54* (2006.01)
*G06K 9/60* (2006.01)

(52) U.S. Cl.
USPC ........... 358/488; 358/486; 358/496; 358/497; 382/305; 382/306

(58) Field of Classification Search
None
See application file for complete search history.

(56) References Cited

U.S. PATENT DOCUMENTS

| | | | | |
|---|---|---|---|---|
| 4,926,490 A * | 5/1990 | Mano | | 382/177 |
| 8,548,254 B2 * | 10/2013 | Ishikawa et al. | | 382/217 |
| 2003/0202191 A1 * | 10/2003 | Osawa et al. | | 358/1.1 |
| 2008/0082829 A1 * | 4/2008 | Yoshioka et al. | | 713/176 |
| 2008/0263036 A1 * | 10/2008 | Yamamoto | | 707/6 |

FOREIGN PATENT DOCUMENTS

JP 7-192109 A 7/1995

* cited by examiner

*Primary Examiner* — Marivelisse Santiago Cordero
*Assistant Examiner* — Moustapha Diaby
(74) *Attorney, Agent, or Firm* — Sughrue Mion, PLLC

(57) ABSTRACT

Provided is an image information registration system including an image information acquisition unit that acquires image information appearing on a surface of a medium, a rotation angle information acquisition unit that acquires rotation angle information corresponding to a rotation angle of the medium with respect to a reading direction based on the image information, a retrieval information acquisition unit that acquires retrieval information including at least one item of attribute information and association system information that represents an association system which are correlated with the rotation angle information based on the rotation angle information, a target information acquisition unit that acquires one or plural items of target information stored in the association system identified by the association system information according to the retrieval information, and an image information registration unit that registers the image information according to the acquired one or plural items of target information.

20 Claims, 14 Drawing Sheets

| ROTATION ANGLE INFORMATION | RETRIEVAL ATTRIBUTE NAME | RETRIEVAL ATTRIBUTE VALUE | ASSOCIATION SYSTEM INFORMATION |
|---|---|---|---|
| 0° | NAME | SPECIFICATION FOLDER | DOCUMENT MANAGEMENT |
| 45° | NAME | DESIGN DOCUMENT FOLDER | DOCUMENT MANAGEMENT |
| 90° | NAME | SPECIFICATION REVIEW REPORT FOLDER | DOCUMENT MANAGEMENT |
| 135° | NAME | DESIGN DOCUMENT REVIEW REPORT FOLDER | DOCUMENT MANAGEMENT |
| 180° | STARTING DATE | TODAY | WORKFLOW |
| 225° | STARTING DATE | 1 TO 3 DAYS AGO | WORKFLOW |
| 270° | STARTING DATE | 4 TO 7 DAYS AGO | WORKFLOW |
| 315° | STARTING DATE | 8 TO 14 DAYS AGO | WORKFLOW |

FIG. 4

| ROTATION ANGLE INFORMATION | RETRIEVAL ATTRIBUTE NAME | RETRIEVAL ATTRIBUTE VALUE | ASSOCIATION SYSTEM INFORMATION |
|---|---|---|---|
| 0° | STARTING DATE | TODAY | WORKFLOW |
| 90° | STARTING DATE | 1 TO 7 DAYS AGO | WORKFLOW |
| 180° | NAME | SPECIFICATION FOLDER | DOCUMENT MANAGEMENT |
| 270° | NAME | DESIGN DOCUMENT FOLDER | DOCUMENT MANAGEMENT |

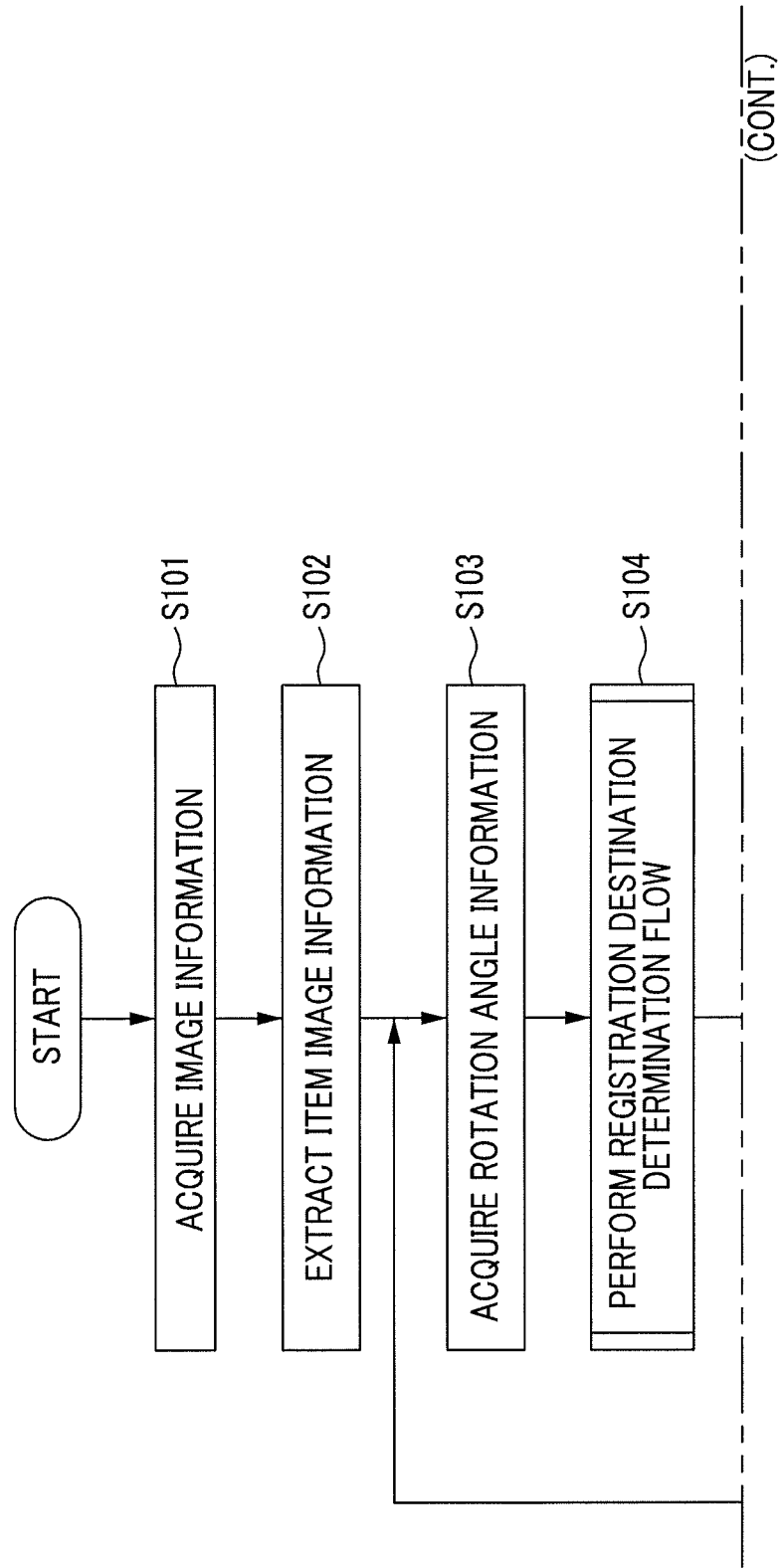

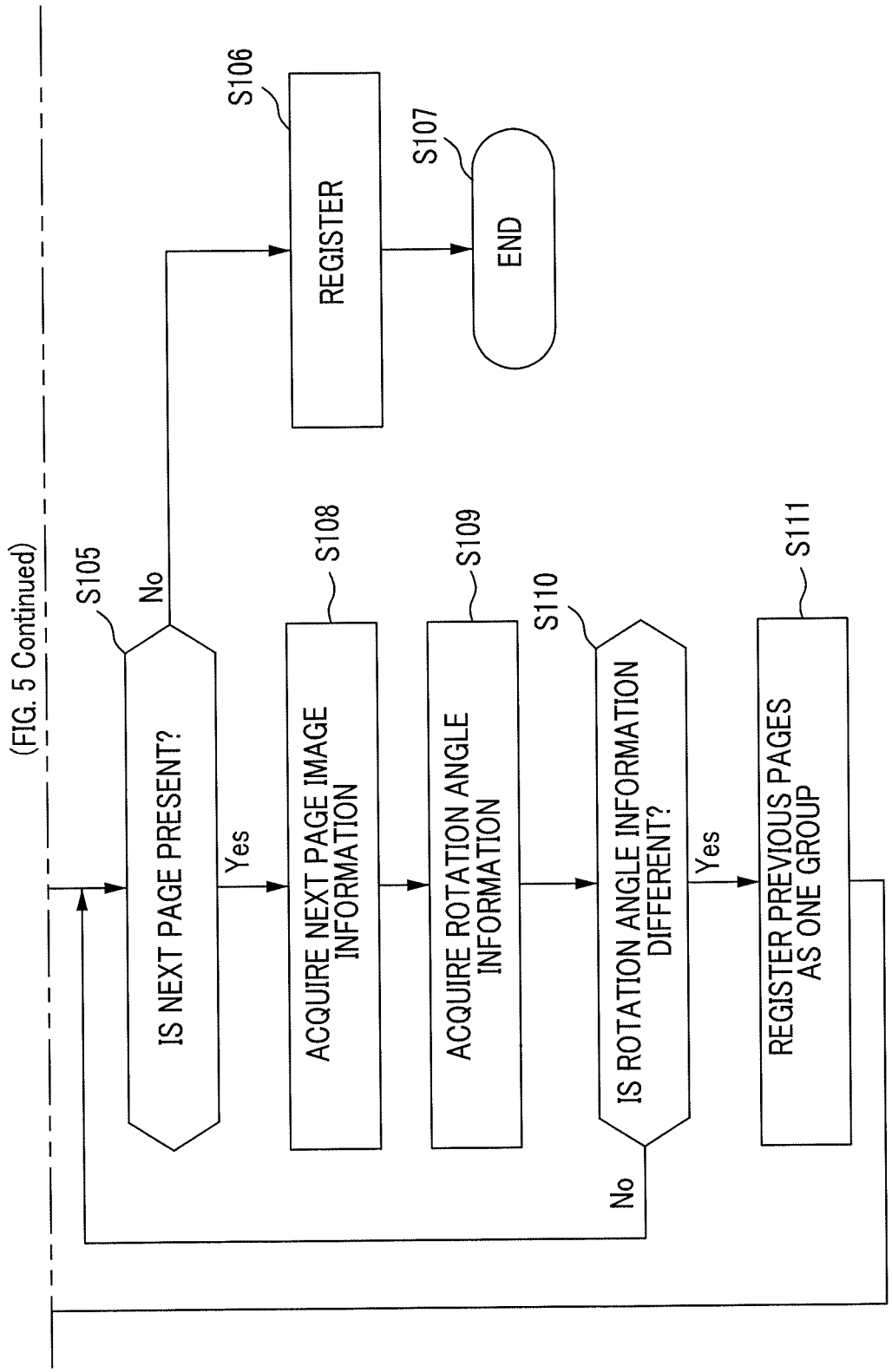

FIG. 8

| USER IDENTIFICATION INFORMATION | ROTATION ANGLE INFORMATION | RETRIEVAL ATTRIBUTE NAME | RETRIEVAL ATTRIBUTE NAME | ASSOCIATION SYSTEM INFORMATION |
|---|---|---|---|---|
| USER A | 0° | STARTING DATE | TODAY | WORKFLOW |
| USER A | 90° | STARTING DATE | 1 TO 7 DAYS AGO | WORKFLOW |
| USER A | 180° | NAME | SPECIFICATION FOLDER | DOCUMENT MANAGEMENT |
| USER A | 270° | NAME | DESIGN DOCUMENT FOLDER | DOCUMENT MANAGEMENT |
| USER B | 0° | STARTING DATE | TODAY TO 7 DAYS AGO | WORKFLOW |
| USER B | 90° | NAME | SPECIFICATION FOLDER | DOCUMENT MANAGEMENT |
| USER B | 180° | NAME | DESIGN DOCUMENT FOLDER | DOCUMENT MANAGEMENT |
| USER B | 270° | NAME | REVIEW REPORT FOLDER | DOCUMENT MANAGEMENT |

FIG. 10

| SURFACE INFORMATION | ROTATION ANGLE INFORMATION | RETRIEVAL ATTRIBUTE NAME | RETRIEVAL ATTRIBUTE VALUE | ASSOCIATION SYSTEM INFORMATION |
|---|---|---|---|---|
| FRONT SIDE | 0° | NAME | SPECIFICATION FOLDER | DOCUMENT MANAGEMENT |
| FRONT SIDE | 90° | NAME | DESIGN DOCUMENT FOLDER | DOCUMENT MANAGEMENT |
| FRONT SIDE | 180° | NAME | SPECIFICATION REVIEW REPORT FOLDER | DOCUMENT MANAGEMENT |
| FRONT SIDE | 270° | NAME | DESIGN DOCUMENT REVIEW REPORT FOLDER | DOCUMENT MANAGEMENT |
| REAR SIDE | 0° | STARTING DATE | TODAY | WORKFLOW |
| REAR SIDE | 90° | STARTING DATE | 1 TO 3 DAYS AGO | WORKFLOW |
| REAR SIDE | 180° | STARTING DATE | 4 TO 7 DAYS AGO | WORKFLOW |
| REAR SIDE | 270° | STARTING DATE | 8 TO 14 DAYS AGO | WORKFLOW |

FIG. 11

| ROTATION ANGLE INFORMATION | RETRIEVAL ATTRIBUTE NAME | RETRIEVAL ATTRIBUTE VALUE | ASSOCIATION SYSTEM INFORMATION |
|---|---|---|---|
| 0° | NAME | SPECIFICATION FOLDER | DOCUMENT MANAGEMENT |
| 45° | NAME | DESIGN DOCUMENT FOLDER | DOCUMENT MANAGEMENT |
| 90° | NAME | SPECIFICATION REVIEW REPORT FOLDER | DOCUMENT MANAGEMENT |
| 135° | NAME | DESIGN DOCUMENT REVIEW REPORT FOLDER | DOCUMENT MANAGEMENT |
| 180° | STARTING DATE | TODAY | WORKFLOW |
| 225° | STARTING DATE | 1 TO 3 DAYS AGO | WORKFLOW |
| 270° | STARTING DATE | 4 TO 7 DAYS AGO | WORKFLOW |
| 315° | STARTING DATE | 8 TO 14 DAYS AGO | WORKFLOW |

FIG. 13

| SUPPLY INFORMATION | ROTATION ANGLE INFORMATION | RETRIEVAL ATTRIBUTE NAME | RETRIEVAL ATTRIBUTE VALUE | ASSOCIATION SYSTEM INFORMATION |
|---|---|---|---|---|
| DADF | 0° | NAME | SPECIFICATION FOLDER | DOCUMENT MANAGEMENT |
| DADF | 90° | NAME | DESIGN DOCUMENT FOLDER | DOCUMENT MANAGEMENT |
| DADF | 180° | NAME | SPECIFICATION REVIEW REPORT FOLDER | DOCUMENT MANAGEMENT |
| DADF | 270° | NAME | DESIGN DOCUMENT REVIEW REPORT FOLDER | DOCUMENT MANAGEMENT |
| PLATEN | 0° | STARTING DATE | TODAY | WORKFLOW |
| PLATEN | 90° | STARTING DATE | 1 TO 3 DAYS AGO | WORKFLOW |
| PLATEN | 180° | STARTING DATE | 4 TO 7 DAYS AGO | WORKFLOW |
| PLATEN | 270° | STARTING DATE | 8 TO 14 DAYS AGO | WORKFLOW |

IMAGE INFORMATION REGISTRATION SYSTEM, NON-TRANSITORY COMPUTER READABLE MEDIUM STORING AN IMAGE INFORMATION REGISTRATION PROGRAM, AND IMAGE INFORMATION REGISTRATION METHOD

CROSS-REFERENCE TO RELATED APPLICATIONS

This application is based on and claims priority under 35 USC 119 from Japanese Patent Application No. 2012-064218 filed Mar. 21, 2012.

BACKGROUND (i) Technical Field

The present invention relates to an image information registration system, a non-transitory computer readable medium storing an image information registration program, and an image information registration method.

(ii) Related Art

An image processing device that sequentially supplies plural sheets of a document to a scanner and stores a character or a graphic appearing on a surface of the document read by the scanner as image data is known.

SUMMARY

According to an aspect of the invention, there is provided an image information registration system including: an image information acquisition unit that acquires image information appearing on a surface of a medium by optically reading the surface of the medium; a rotation angle information acquisition unit that acquires rotation angle information corresponding to a rotation angle of the medium with respect to a reading direction of the image information acquisition unit based on the image information; a retrieval information acquisition unit that acquires retrieval information including at least one item of attribute information and association system information that represents an association system which are correlated with the rotation angle information based on the acquired rotation angle information; a target information acquisition unit that acquires one or plural items of target information stored in the association system identified by the association system information according to the acquired retrieval information; and an image information registration unit that registers the image information according to the acquired one or plural items of target information.

BRIEF DESCRIPTION OF THE DRAWINGS

Exemplary embodiments of the present invention will be described in detail based on the following figures, wherein:

FIG. 4 is a diagram illustrating an example of retrieval information stored in a retrieval information storage unit according to the first exemplary embodiment;

FIG. 5 is a diagram illustrating an example of the flow of the image information registration system according to the first exemplary embodiment;

FIG. 8 is a diagram illustrating an example of retrieval information stored in a retrieval information storage unit according to the second exemplary embodiment;

FIG. 10 is a diagram illustrating an example of retrieval information stored in a retrieval information storage unit according to the third exemplary embodiment;

FIG. 11 is a diagram illustrating an example of retrieval information stored in a retrieval information storage unit according to a fourth exemplary embodiment;

FIG. 13 is a diagram illustrating an example of retrieval information stored in a retrieval information storage unit according to the fifth exemplary embodiment.

DETAILED DESCRIPTION

Figure 1:
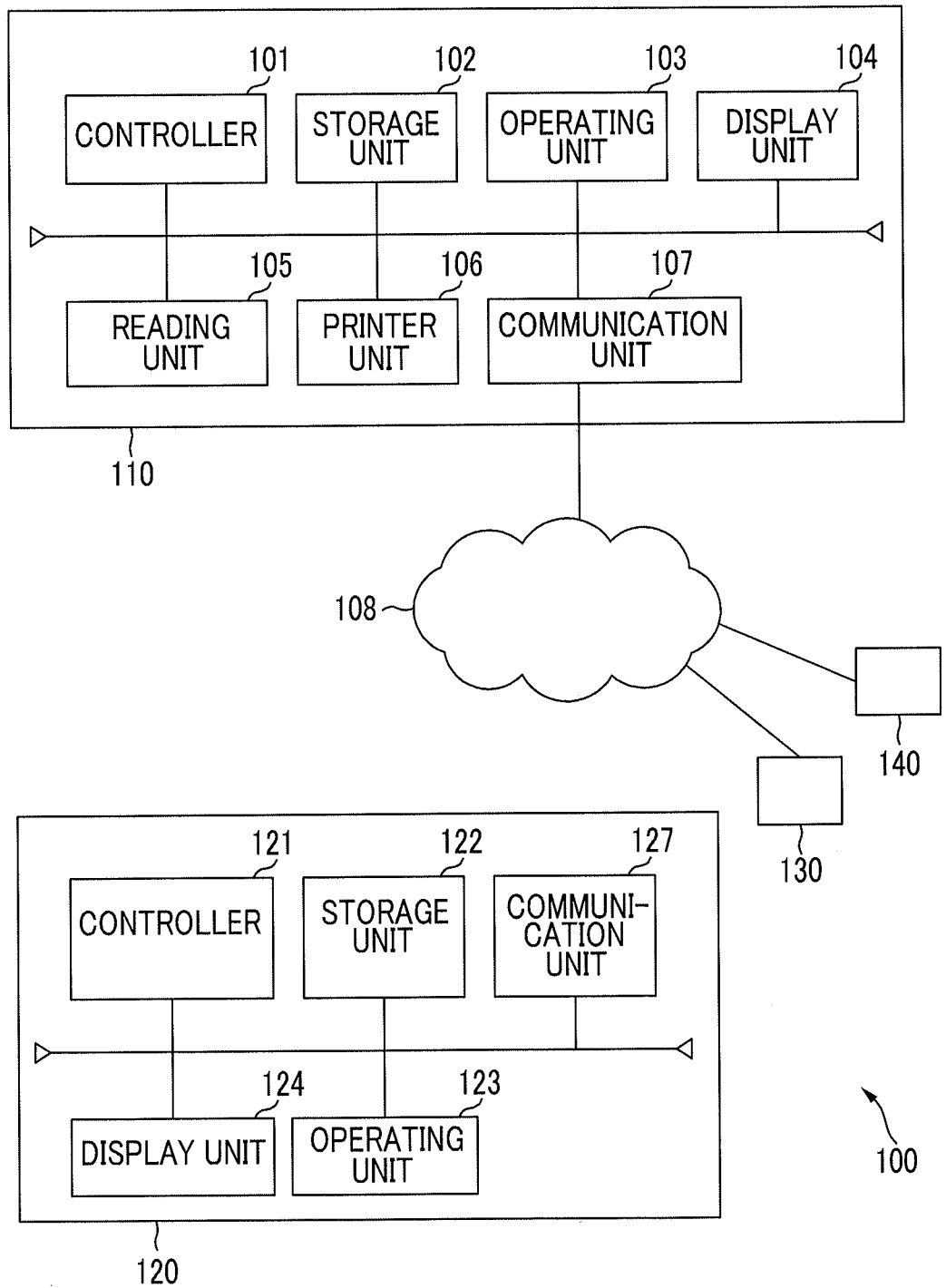
FIG. 1 is a diagram illustrating an overview of a configuration of an image information registration system according to a first exemplary embodiment.

Hereinafter, an exemplary embodiment of the invention will be described with reference to the drawings. In the drawings, the same or equivalent elements will be denoted by the same reference numerals, and redundant description thereof will not be provided.

First Exemplary Embodiment

FIG. 1 is a diagram illustrating an overview of a configuration of an image information registration system according to a first exemplary embodiment of the invention. As illustrated in FIG. 1, an image information registration system 100 according to this exemplary embodiment mainly includes an image processing device 110, an image information registration device 120, a workflow system 130, and a document management system 140.

The image processing device 110 is a multi-functional machine that includes a copying function, a scanning function, and the like, for example. As illustrated in FIG. 1, the image processing device 110 includes a control unit 101, a storage unit 102, an operating unit 103, a display unit 104, a reading unit 105, a printer unit 106, and a communication unit 107. The respective units 101 to 107 are connected to each other by an internal bus 109.

The control unit 101 is an MPU, for example, and operates according to a program stored in the storage unit 102.

The storage unit 102 is configured as an information recording medium such as a ROM, a RAM, or a hard disk, and is an information recording medium that stores a program executed by the control unit 101. Moreover, the storage unit 102 also operates as a working memory of the control unit 101. The program may be provided by being downloaded via a network, for example, or the program may be provided as various types of computer readable image recording media such as a CD-ROM or a DVD-RAM.

The operating unit 103 is configured as an interface such as plural buttons and a touch panel displayed on the display unit 104 described later, and outputs the content of an instruction of the user to the control unit 101 in response to the instruction.

The display unit 104 is a liquid crystal display, an organic EL display, or the like, for example, and displays information according to an instruction from the control unit 101.

The reading unit 105 scans the surface of a medium using an image sensor, for example, to read a character, a graphic, or the like appearing on the surface of the medium. The reading unit 105 may include an automatic document supply device that sequentially supplies plural sheets to the reading unit 105.

The printer unit 106 prints an image acquired by the reading unit 105 or an image stored in the storage unit 102 according to an instruction of the user, for example. The communication unit 107 connects the image processing device 110 to the image information registration device 120, the workflow system 130, and the document management system 140 via the network 108.

The image information registration device 120 is a server, for example, and includes a control unit 121, a storage unit 122, and a communication unit 127. In addition to the above, the image information registration device 120 may include a display unit 124 and an operating unit 123. Moreover, the workflow system 130 and the document management system 140 are configured as a so-called server and client system, for example, and include a server and a client. The server and the client include the control unit 121, the storage unit 122, and the communication unit 127. Similarly, the workflow system 130 and the document management system 140 may include the display unit 124 and the operating unit 123. The configuration of the control unit 121, the storage unit 122, the operating unit 123, the communication unit 127, and the display unit 124 are the same as that of the control unit 101, the storage unit 102, the operating unit 103, the display unit 104, and the communication unit 107 of the image processing device 110, and the description thereof will not be provided. The image information registration device 120 may be configured as a so-called server and client system.

Figure 2:
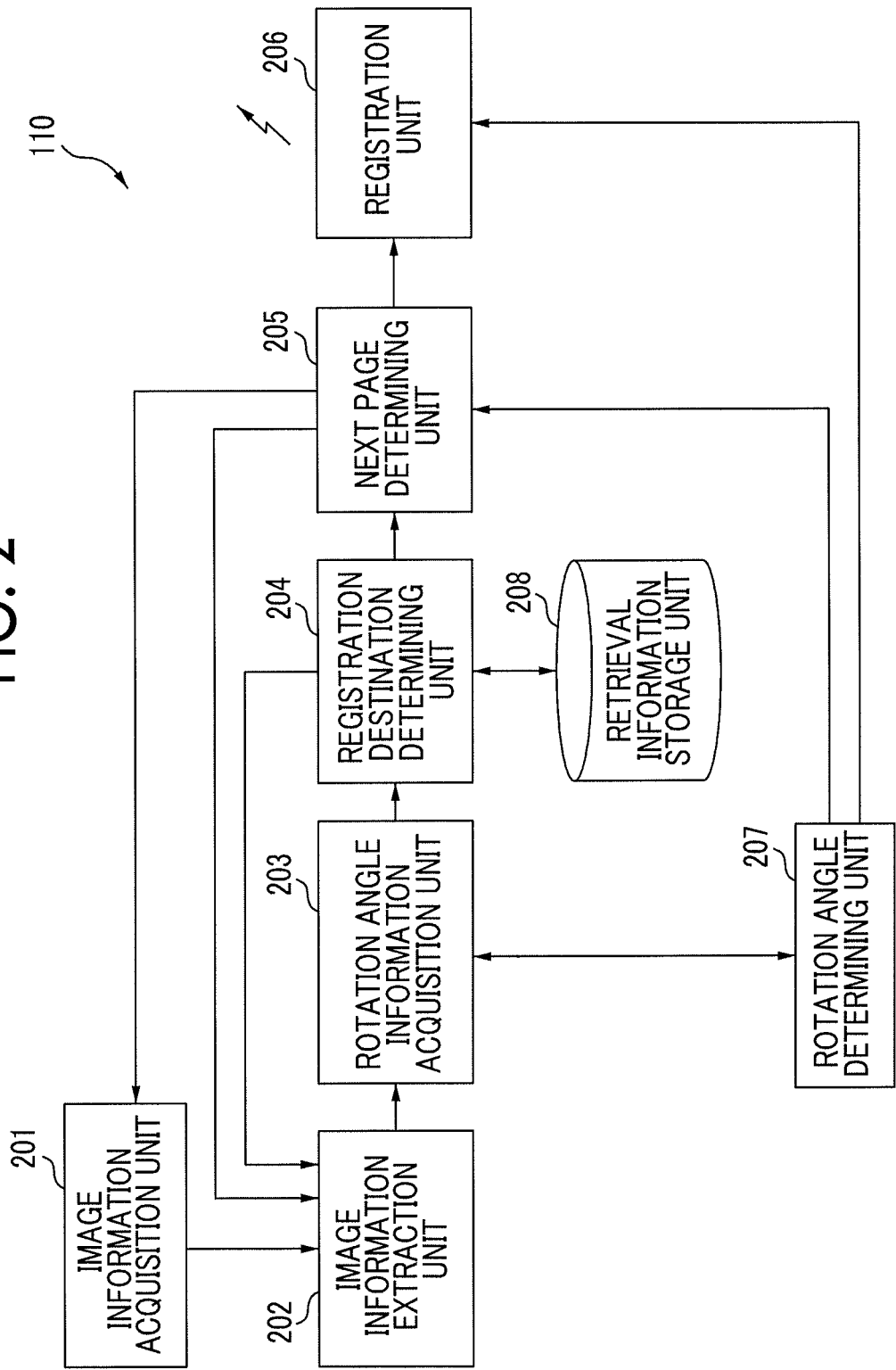
FIG. 2 is a diagram illustrating a functional configuration of an image information registration device according to the first exemplary embodiment.

Next, a functional configuration of the image information registration device 120 will be described. As illustrated in FIG. 2, the image information registration device 120 includes an image information acquisition unit 201, an image information extraction unit 202, a rotation angle information acquisition unit 203, a registration destination determining unit 204, a next page determining unit 205, a registration unit 206, and a rotation angle determining unit 207.

The image information acquisition unit 201 acquires the image information acquired by the reading unit 105 of the image processing device 110. Specifically, for example, when the image processing device 110 includes an automatic sheet supply device (not illustrated) that sequentially supplies plural sheets to the reading unit 105, the image information acquisition unit 201 acquires the plural sheets as a group of image information of plural pages. Moreover, for example, when a document placed on a platen is read by reading unit 105, the image information acquisition unit 201 acquires the image information of the document.

The image information extraction unit 202 extracts the image information corresponding to one page of the document among the group of image information of the plural pages of the document included in the image information acquired by the image information acquisition unit 201. When a document placed on a platen is read, the image information extraction unit 202 reads the image information of the document.

The rotation angle information acquisition unit 203 acquires rotation angle information corresponding to a rotation angle of the image information extracted by the image information extraction unit 202. The rotation angle corresponds to a rotation angle with respect to a direction that is determined in advance as a document setting direction in the image processing device 110, for example. Moreover, the rotation angle information acquisition unit 203 acquires the acquired rotation angle as the rotation angle information of plural patterns such as, for example, 0°, 90°, 180°, or 270°. That is, when the rotation angle (for example, 95°) is within a preset range (for example, ±20° from the angle (for example, 90° of a preset pattern, the rotation angle is acquired as the rotation angle information (for example, rotation angle information indicating 90°) of one of the plural preset patterns. The rotation angle is detected based on the direction of a character by recognizing the character appearing on the surface of a document using a character recognition technique, for example.

The registration destination determining unit 204 determines a registration destination of the image information according to the acquired rotation angle information (for example, 0°, 90°, 180°, or 270°). The details of the functional configuration of the registration destination determining unit 204 will be described later.

When the registration destination of the image information is determined by the registration destination determining unit 204, the next page determining unit 205 determines whether image information (next page image information) corresponding to the next page of the image information is present. Moreover, when it is determined that the next page image information is present, the image information extraction unit 202 instructs to extract the next page image information. On the other hand, when it is determined that the next page image information is not present, the registration unit 206 registers the image information in the determined registration destination.

The rotation angle determining unit 207 determines whether the rotation angle information acquired for the image information corresponding the previous page is different from the rotation angle information acquired for the image information (next page image information) corresponding to the next page. When it is determined that the two items of rotation angle information are the same, the rotation angle determining unit 207 instructs the next page determining unit 205 to determine whether the next page is present. On the other hand, when it is determined that the two items of rotation angle information are different, the rotation angle determining unit 207 instructs the registration unit 206 to register the respective items of image information of the previous pages of which the items of rotation angle information are determined to be the same in the registration destination determined by the registration destination determining unit 204 as one group of image information.

The registration unit 206 registers the image information or a group of image information in the registration destination determined by the registration destination determining unit 204. Specifically, when there are plural items of image information of which the items of rotation angle information are the same as described above, the registration unit 206 registers the respective items of image information as one group of image information. When there is only one image information having the same rotation angle information, the registration unit 206 registers the image information. The registration unit 206 registers the image information with the rotation angle returned to a normal reading direction. That is, for example, if the rotation angle of the image information is 90°, the registration unit 206 registers the image information after rotating the image by 90° in the reverse direction.

Figure 3:
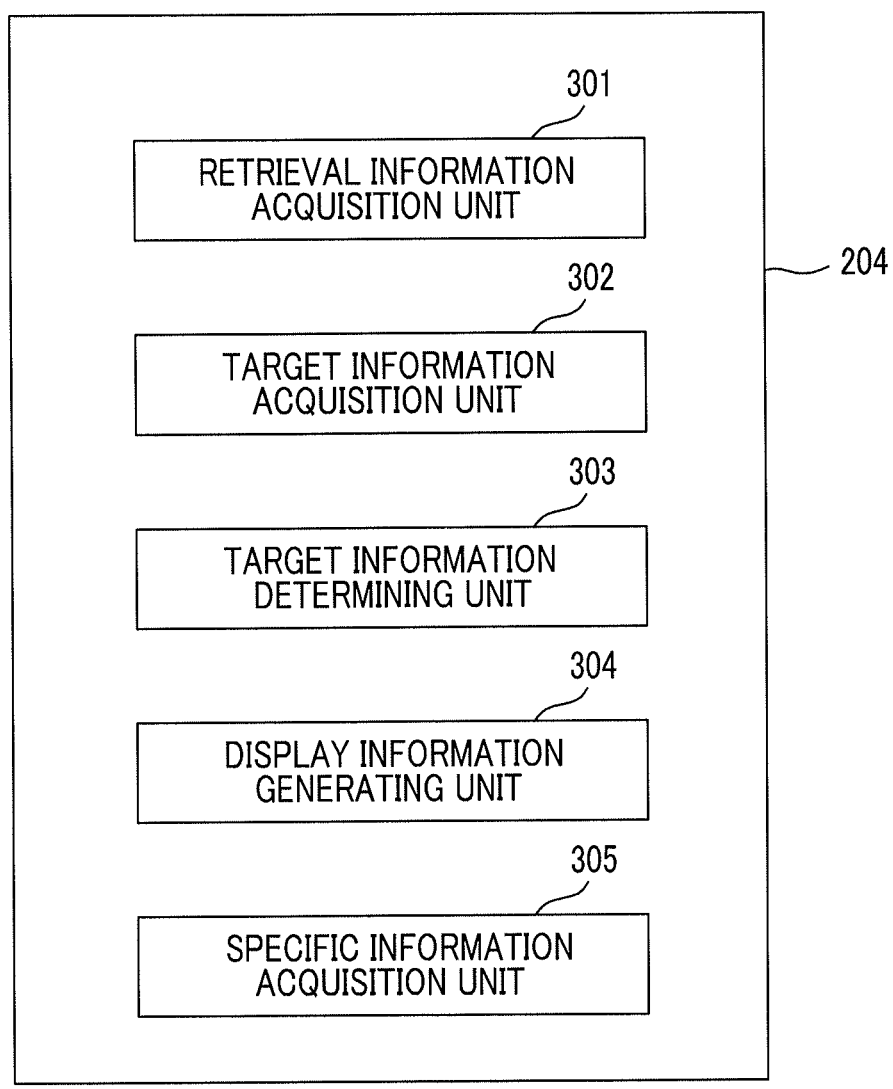
FIG. 3 is a diagram illustrating an example of a functional configuration of a registration destination determining unit according to the first exemplary embodiment.

Next, the functional configuration of the registration destination determining unit 204 will be described. FIG. 3 is a diagram illustrating an example of the functional configuration of the registration destination determining unit 204. As illustrated in FIG. 3, the registration destination determining unit 204 includes a retrieval information acquisition unit 301, a target information acquisition unit 302, a target information determining unit 303, a display information generating unit 304, and a specific information acquisition unit 305.

The retrieval information acquisition unit 301 acquires retrieval information that is stored in correlation with the rotation angle information from the retrieval information storage unit 208 based on the rotation angle information acquired by the rotation angle information acquisition unit 203. The retrieval information storage unit 208 includes the rotation angle information, attribute information that represents attributes, and association system information that represents an association destination system. The details of the attribute information and the association system information will be described later.

FIG. 4 is a diagram illustrating an example of the retrieval information stored in the retrieval information storage unit 208. As illustrated in FIG. 4, for example, the retrieval information storage unit 208 stores a retrieval attribute name and a retrieval attribute value as the attribute information and the association system information in a table format in correlation with the rotation angle information. As illustrated in FIG. 4, for example, the retrieval information storage unit 208 stores a retrieval attribute name of starting date and a retrieval attribute value of today as the attribute information and information that represents the workflow system 130 as the association system information in correlation with the rotation angle information of 0°. FIG. 4 is an example, and the retrieval information is not limited to this. For example, symbols or the like for identifying "today" and "starting date" may be stored.

That is, in the case of FIG. 4, when the rotation angle information acquired by the rotation angle information acquisition unit 203 is 0°, the retrieval information acquisition unit 301 acquires a starting date as the retrieval attribute name, today as the retrieval attribute value, and the information representing the workflow system 130 as the association destination system. Since the same can be applied to the other items of retrieval information (for example, the cases where the rotation angle information is 90°, 180°, or 270° in FIG. 4), the description thereof will not be provided.

The target information acquisition unit 302 acquires target information corresponding to the retrieval information from the association destination system based on the retrieval information acquired by the retrieval information acquisition unit 301. Here, the association destination system corresponds to the workflow system 130 or the document management system 140. Moreover, the target information corresponds to a job name registered in the workflow system 130 or a folder name registered in the document file, for example. Further, the target information may include the other items of related information such as a starting date and a progress state of a job or the name of a person who is performing the job.

Specifically, in the above example, since the retrieval attribute name of starting date, the retrieval attribute value of today, the association system information of the workflow system 130 are acquired as the retrieval information, the target information acquisition unit 302 acquires target information (for example, a job name of which the starting date is today) of which the starting date is today, for example, from the workflow system 130.

The target information determining unit 303 determines whether plural items of target information have been acquired. When it is determined that plural items of target information have been acquired, the target information determining unit 303 instructs the display information generating unit 304 described later to generate display information for displaying the target information in a predetermined form (for example, a list form).

On the other hand, when it is determined that only one item of target information has been acquired, the target information determining unit 303 instructs the specific information acquisition unit 305 to acquire the single target information. Here, the target information corresponds to information (registration destination information) that represents a registration destination. Thus, in the above example, the image information or the group of image information is registered in a storage area (for example, a folder of job name A) of the storage unit 122 of the workflow system 130, which is specified by the retrieval attribute name of starting data and the retrieval attribute value of today as the retrieval information.

When the target information determining unit 303 determines that plural items of target information have been acquired, the display information generating unit 304 generates display information for displaying the target information in a preset form (for example, a list form) and displays the display information. The display information may be displayed on the display unit 104 of the image processing device 110 and may be displayed on the display unit 124 of the image information registration device 120. Moreover, the display information may be displayed on a display unit (not illustrated) of another terminal used by the user.

Moreover, when the user specifies one item of target information among the plural items of target information being displayed, the specific information acquisition unit 305 acquires the specified target information. The target information corresponds to the information (registration destination information) that represents the registration destination. That is, in the above example, the image information or the group of image information is registered in a storage area (for example, a folder of job name B) of the storage unit 122 of the workflow system 130, which is specified by the retrieval attribute name of starting date and the retrieval attribute value of today as the retrieval information and which is identified by the specified target information.

The functional configurations of the image processing device 110 and the registration destination determining unit 204 illustrated in FIGS. 2 and 3 are exemplary, and the configurations of the image processing device 110 and the registration destination determining unit 204 according to this exemplary embodiment are not limited to the above.

Next, an example of the flow of the image information registration system 100 according to this exemplary embodiment will be described. FIG. 5 is a diagram illustrating an example of the flow of the image information registration system 100 according to this exemplary embodiment.

The image information acquisition unit 201 acquires the image information acquired by the reading unit 105 of the image processing device 110 (S101). The image information extraction unit 202 acquires the image information of the first page among the plural items of image information of the plural pages of the document included in the image information acquired by the image information acquisition unit 201 (S102). The rotation angle information acquisition unit 203 acquires the rotation angle information of the image information of the first page (S103). The registration destination determining unit 204 determines a registration destination of the image information of the first page based on the rotation angle information of the acquired image information of the first page (S104). The details of the registration destination determination flow of step S104 will be described later.

The next page determining unit 205 determines whether image information (next page image information) of the next page is present (S105). The next page image information is image information of the next page, and in the above example, corresponds to the image information of the second page, for example. When it is determined that the next page image information is not present, the image information is registered in the registration destination determined by the registration destination determining unit 204 (S106). Then, this process ends (S107). That is, in this case, the image information of the first page is registered. On the other hand, when it is determined in step S105 that the next page image information is present, the image information extraction unit 202 extracts the next page image information (S108). The rotation angle information acquisition unit 203 acquires the rotation angle information of the next page image information (S109).

The rotation angle determining unit 207 determines whether the rotation angle information acquired for the image information (for example, the image information of the first page) of the previous page is different from the rotation angle information acquired for the next page image information (S110). When the rotation angle determining unit 207 determines that the two items of rotation angle information are the same, the flow returns to step S105, and the same process as above, for example, a process of determining whether the image information (for example, the image information of the third page) subsequent to the next page image information is present, is performed.

On the other hand, when the rotation angle determining unit 207 determines that the two items of rotation angle information are different, the respective items of image information of the previous pages are registered in the registration destination determined by the registration destination determining unit 204 as one group of image information (S111). That is, for example, when the rotation angle information acquired for the image information of the first page is different from the rotation angle information acquired for the image information of the second page, the image information of the previous pages (in this case, the image information of the first page only) is registered in the determined registration destination. Moreover, when the respective items of the rotation angle information acquired for the image information of the first and second pages are the same, and the rotation angle information acquired for the image information of the third page is different from the rotation angle information acquired for the image information of the first and second pages, the image information of the previous pages (in this case, the image information of the first and second pages) is registered in the registration destination determined in step S104.

The flow returns to step S103, and the same process as above (for example, a process (S103) of acquiring the rotation angle information for the image information of a page subsequent to the page of which the acquired rotation angle information is different from that of the previous page and a process (S104) of determining the registration destination) is performed. when the respective items of the rotation angle information acquired for the image information of the first and second pages are the same, and the rotation angle information acquired for the image information of the third page is different from the rotation angle information acquired for the image information of the first and second pages, similarly to the above, a process of acquiring the rotation angle information for the image information of the third page and determining the registration destination is performed.

Figure 6:
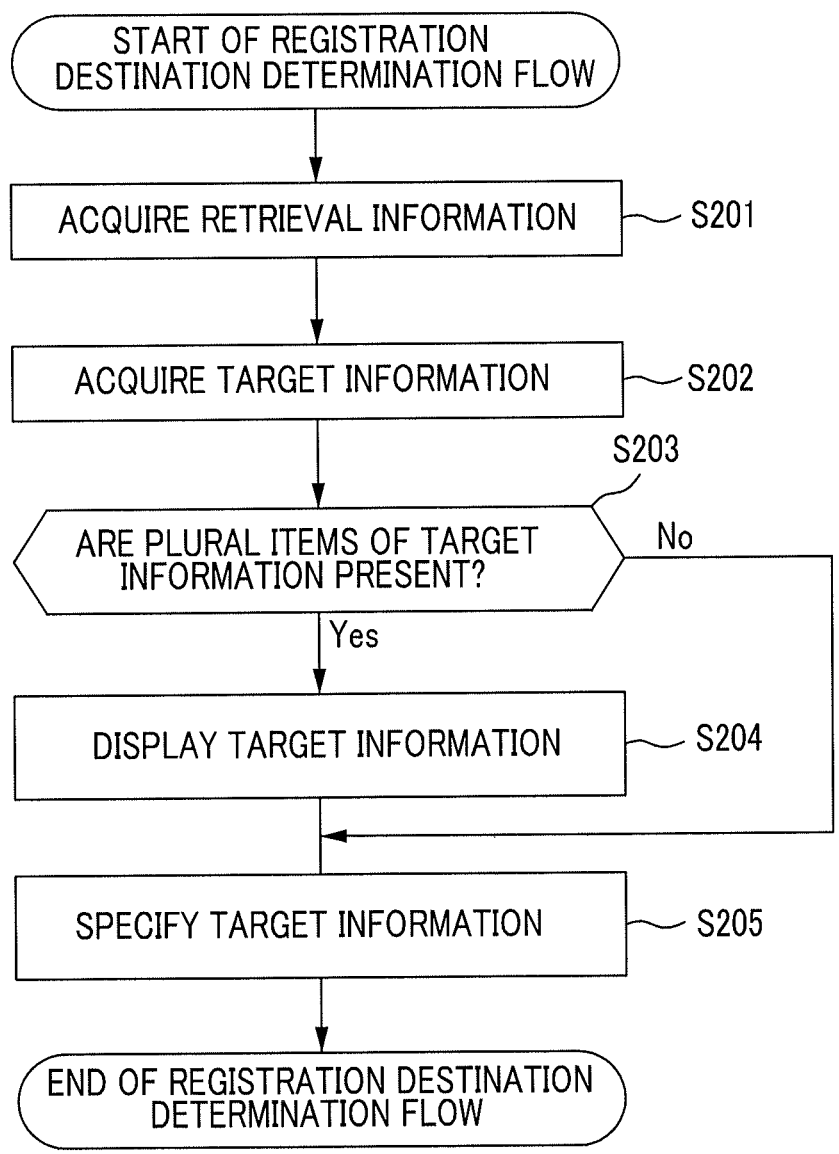
FIG. 6 is a diagram illustrating an example of a registration destination determination flow according to the first exemplary embodiment.

Next, the registration destination determination flow (S104) will be described. FIG. 6 is a diagram illustrating an example of the registration destination determination flow.

As illustrated in FIG. 6, first, the retrieval information acquisition unit 301 acquires the retrieval information stored in correlation with the rotation angle information from the retrieval information storage unit 208 based on the rotation angle information acquired by the rotation angle information acquisition unit 203 (S201).

The target information acquisition unit 302 acquires the target information corresponding to the retrieval information from the association destination system (for example, the workflow system 130 or the document management system 140) based on the retrieval information acquired by the retrieval information acquisition unit 301 (S202).

The target information determining unit 303 determines whether plural items of target information have been acquired (S203). When it is determined that plural items of target information have been acquired, the display information generating unit 304 generates display information for displaying the target information in a preset form and displays the display information on the display unit (S204). On the other hand, when only one item of target information has been acquired, the flow proceeds to step S205.

The specific information acquisition unit 305 acquires the specified target information (S205). For example, when plural items of target information are present, the specific information corresponds to the target information selected by the user. On the other hand, when it is determined in step S203 that only one item of target information has been acquired, the specific information corresponds to the target information. The registration unit 206 registers the image information or the group of image information of which the registration destination is determined in a registration destination (for example, a folder associated with the job name A in the workflow system 130 or a specification folder or a design document folder of the document management system 140) identified by the specific information. Subsequently, the flow proceeds to step S105.

The invention is not limited to the above exemplary embodiment, and the configuration illustrated in the exemplary embodiment can be substituted with a configuration substantially the same as the configuration illustrated in the exemplary embodiment, a configuration that realizes the same operational effects, or a configuration capable of achieving the same objects. For example, in the above description, although the workflow system 130 or the document management system 140 has been described as an example of the association destination system, the other system may be included.

Second Exemplary Embodiment

Next, a second exemplary embodiment of the invention will be described. This exemplary embodiment is different from the first exemplary embodiment in that the registration destination determining unit 204 includes a user identification information acquisition unit 306, and the retrieval information storage unit 204 stores user identification information in correlation in addition to the rotation angle information that represents a rotation angle, the attribute information that represents attributes, and the association system information that represents the association destination system. In the following description, the description of the same portions as those of the first exemplary embodiment will not be provided.

Figure 7:
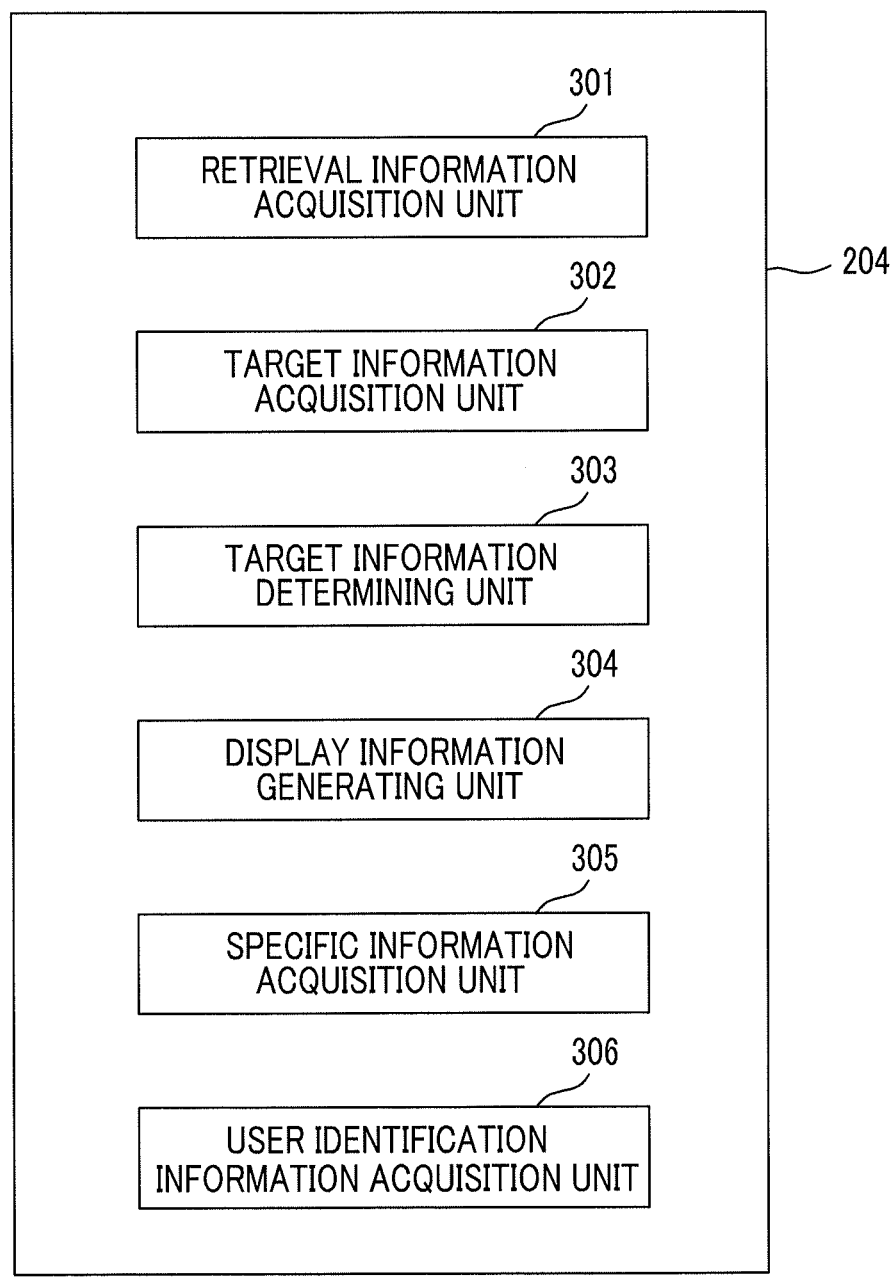
FIG. 7 is a diagram illustrating an example of a functional configuration of a registration destination determining unit according to a second exemplary embodiment.

FIG. 7 is a diagram illustrating an example of a functional configuration of a registration destination determining unit according to this exemplary embodiment. As illustrated in FIG. 7, the registration destination determining unit 204 of this exemplary embodiment includes a user identification information acquisition unit 306 in addition to the retrieval information acquisition unit 301, the target information acquisition unit 302, the target information determining unit 303, the display information generating unit 304, and the specific information acquisition unit 305.

The user identification information acquisition unit 306 acquires user identification information for identifying users. For example, the user identification information may be acquired when the user inputs a unique user ID to the operating unit 103. Moreover, the user identification information may be acquired when a preset card is passed over an authentication unit (not illustrated) of the image processing device 110.

The retrieval information acquisition unit 301 acquires the retrieval information stored in correlation with the rotation angle information and the user identification information from the retrieval information storage unit 208 based on the rotation angle information and the user identification information acquired by the rotation angle information acquisition unit 203.

Here, in this exemplary embodiment, the retrieval information storage unit 208 stores the rotation angle information that represents a rotation angle, the attribute information that represents attributes, the association system information that represents the association destination system, and the user identification information in correlation. FIG. 8 is a diagram illustrating an example of the retrieval information stored in the retrieval information storage unit 208.

That is, when user A is acquired as the user identification information, and 0° is acquired as the rotation angle information by the rotation angle information acquisition unit 203, the retrieval information acquisition unit 301 acquires a retrieval attribute name of starting date, a retrieval attribute value of today, and association system information of the workflow system 130 as the retrieval information.

The other features are the same as those of the first exemplary embodiment, and description thereof will not be provided. The invention is not limited to the above exemplary embodiment, and the configuration illustrated in the exemplary embodiment can be substituted with a configuration substantially the same as the configuration illustrated in the exemplary embodiment, a configuration that realizes the same operational effects, or a configuration capable of achieving the same objects.

Third Exemplary Embodiment

Next, a third exemplary embodiment of the invention will be described. This exemplary embodiment is mainly different from the first exemplary embodiment in that the registration destination determining unit 204 includes a surface determining unit 307 that determines whether a surface of a medium read by the reading unit 105 is a front side or a back side, and the retrieval information storage unit 204 stores surface information that represents whether the surface of the document read by the reading unit 105 is a front side or a back side in correlation in addition to the rotation angle information that represents a rotation angle, the attribute information that represents attributes, and the association system information that represents an association destination system. In the following description, the description of the same portions as those of the first exemplary embodiment will not be provided.

Figure 9:
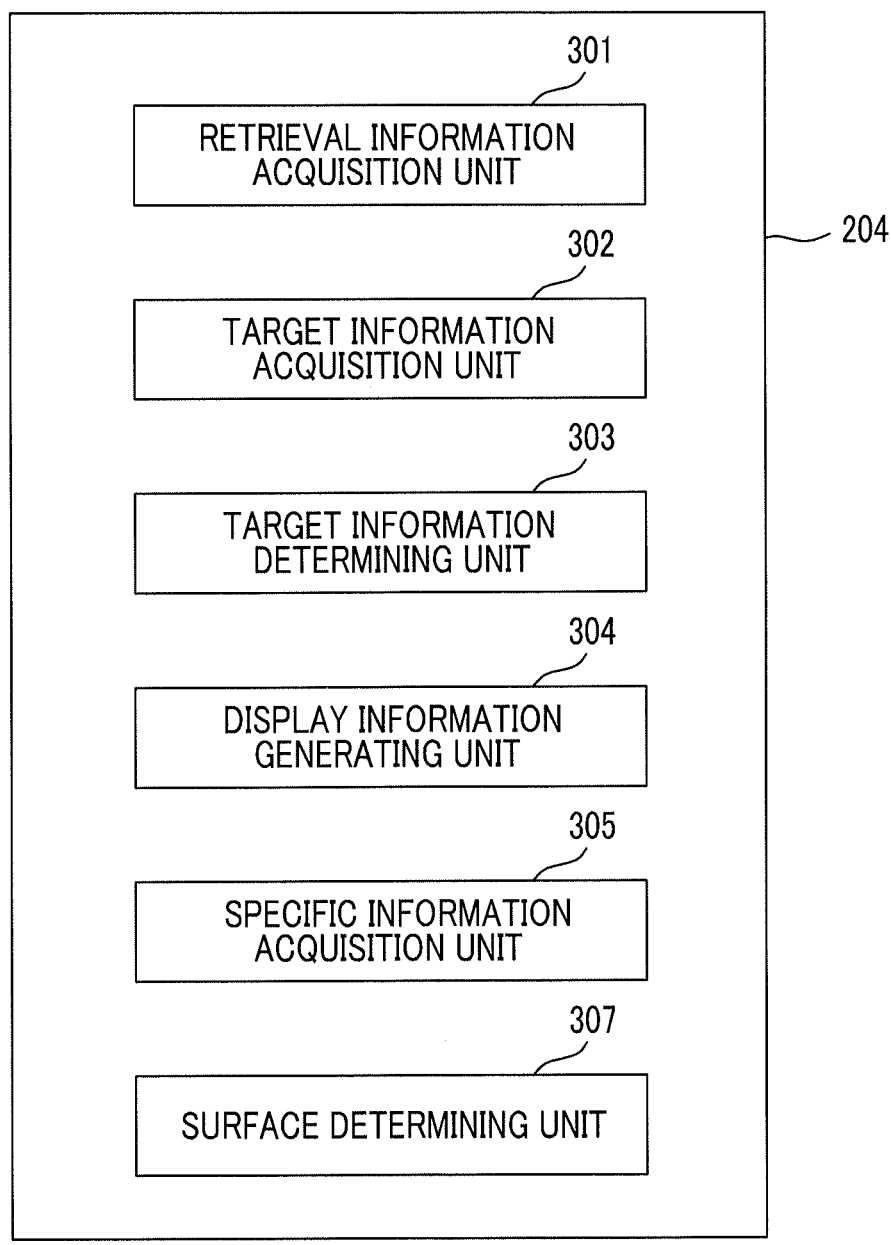
FIG. 9 is a diagram illustrating an example of a functional configuration of a registration destination determining unit according to the third exemplary embodiment.

FIG. 9 is a diagram illustrating an example of a functional configuration of the registration destination determining unit 204 according to this exemplary embodiment. As illustrated in FIG. 9, the registration destination determining unit 204 of this exemplary embodiment includes a surface determining unit 307 in addition to the retrieval information acquisition unit 301, the target information acquisition unit 302, the target information determining unit 303, the display information generating unit 304, and the specific information acquisition unit 305.

The surface determining unit 307 determines whether the surface of a medium read by the reading unit 105 is a front side or a back side. Specifically, for example, when a character or a graphic appears on the image information acquired by the image information acquisition unit 201, the surface of the medium is determined to be the front side. When a white sheet appears on the image information (a character or a graphic is not included), the surface of the medium is determined to be the back side. In this determination, a character recognition technique or an image recognition technique may be used, for example. Moreover, the surface determining unit 307 acquires surface identification information that identifies whether the surface is a front side or a back surface based on the determination result.

The retrieval information acquisition unit 301 acquires the retrieval information stored in correlation with the rotation angle information and the surface identification information from the retrieval information storage unit 208 based on the rotation angle information and the surface identification information acquired by the rotation angle information acquisition unit 203.

Here, in this exemplary embodiment, the retrieval information storage unit 208 stores the rotation angle information that represents a rotation angle, the attribute information that represents attributes, the association system information that represents the association destination system, and the user identification information in correlation. FIG. 10 is a diagram illustrating an example of the retrieval information stored in the retrieval information storage unit 208.

That is, when identification information that represents a front side is acquired as the surface identification information, and 0° is acquired as the rotation angle information by the rotation angle information acquisition unit 203, the retrieval information acquisition unit 301 acquires a retrieval attribute name of name, a retrieval attribute value of specification folder, and association system information of the document management system 140 as the retrieval information.

The other features are the same as those of the first exemplary embodiment, and description thereof will not be provided. The invention is not limited to the above exemplary embodiment, and the configuration illustrated in the exemplary embodiment can be substituted with a configuration substantially the same as the configuration illustrated in the exemplary embodiment, a configuration that realizes the same operational effects, or a configuration capable of achieving the same object. For example, the registration unit 206 may register only the front side of a medium as the image information. Moreover, the third exemplary embodiment may be used in combination with the first or second exemplary embodiment.

Fourth Exemplary Embodiment

Next, a fourth exemplary embodiment of the invention will be described. This exemplary embodiment is mainly different from the first exemplary embodiment in that the image processing device 110 reads documents by placing the documents on a platen one by one. In the following description, the description of the same portions as those of the first exemplary embodiment will not be provided.

The rotation angle information acquisition unit 203 acquires the rotation angle information of the image information extracted by the image information extraction unit 202. The rotation angle information corresponds to the rotation angle information with respect to a direction that is determined in advance as a document setting direction in the image processing device 110, for example. Moreover, the rotation angle information acquisition unit 203 acquires the acquired rotation angle as the rotation angle information of a larger number of patterns than those used in the first exemplary embodiment, such as, for example, 0°, 45°, 90°, 135°, 180°, 225°, 270°, or 315°. The pattern of the rotation angle information is not limited to the above example, and a different number of patterns may be used. In the image processing device 110 of this exemplary embodiment, it is assumed that the reading unit 105 places documents on a platen and reads the documents rather than using an automatic document supply device that automatically supplies documents sequentially. Thus, the patterning of the rotation angle information may be set to be smaller than 90°.

In this exemplary embodiment, similarly to the first exemplary embodiment, the retrieval information acquisition unit 301 acquires the retrieval information stored in correlation with the rotation angle information from the retrieval information storage unit 208 based on the rotation angle information acquired by the rotation angle information acquisition unit 203. FIG. 11 is a diagram illustrating an example of the retrieval information stored in the retrieval information storage unit.

In the example illustrated in FIG. 11, the rotation angle information is set at intervals of 45°. Moreover, when 45° is acquired by the rotation angle information acquisition unit 203, the retrieval information acquisition unit 301 acquires the retrieval attribute name of the name, the retrieval attribute value of the design document folder, and association system information of a document management system as the retrieval information.

The other features are the same as those of the first exemplary embodiment, and description thereof will not be provided. The invention is not limited to the above exemplary embodiment, and the configuration illustrated in the exemplary embodiment can be substituted with a configuration substantially the same as the configuration illustrated in the exemplary embodiment, a configuration that realizes the same operational effects, or a configuration capable of achieving the same object. Specifically, for example, in the first to third exemplary embodiments, although a case where plural sheets of document are read at once using an automatic document supply device has been described, the first to third exemplary embodiments may be combined with the fourth exemplary embodiment without using the automatic document supply device.

Fifth Exemplary Embodiment

Next, a fifth exemplary embodiment of the invention will be described. This exemplary embodiment is mainly different from the first exemplary embodiment in that the registration destination determining unit 204 includes a supply information acquisition unit 308 that acquires supply information indicating whether the document read by the reading unit 105 is supplied using an automatic document supply device that automatically supplies documents. Moreover, the retrieval information storage unit 208 stores supply information indicating whether the document read by the reading unit 105 is supplied using an automatic document supply device in correlation in addition to the rotation angle information that represents a rotation angle, the attribute information that represents attributes, and the association system information that represents an association destination system. In the following description, the description of the same portions as those of the first exemplary embodiment will not be provided.

Figure 12:
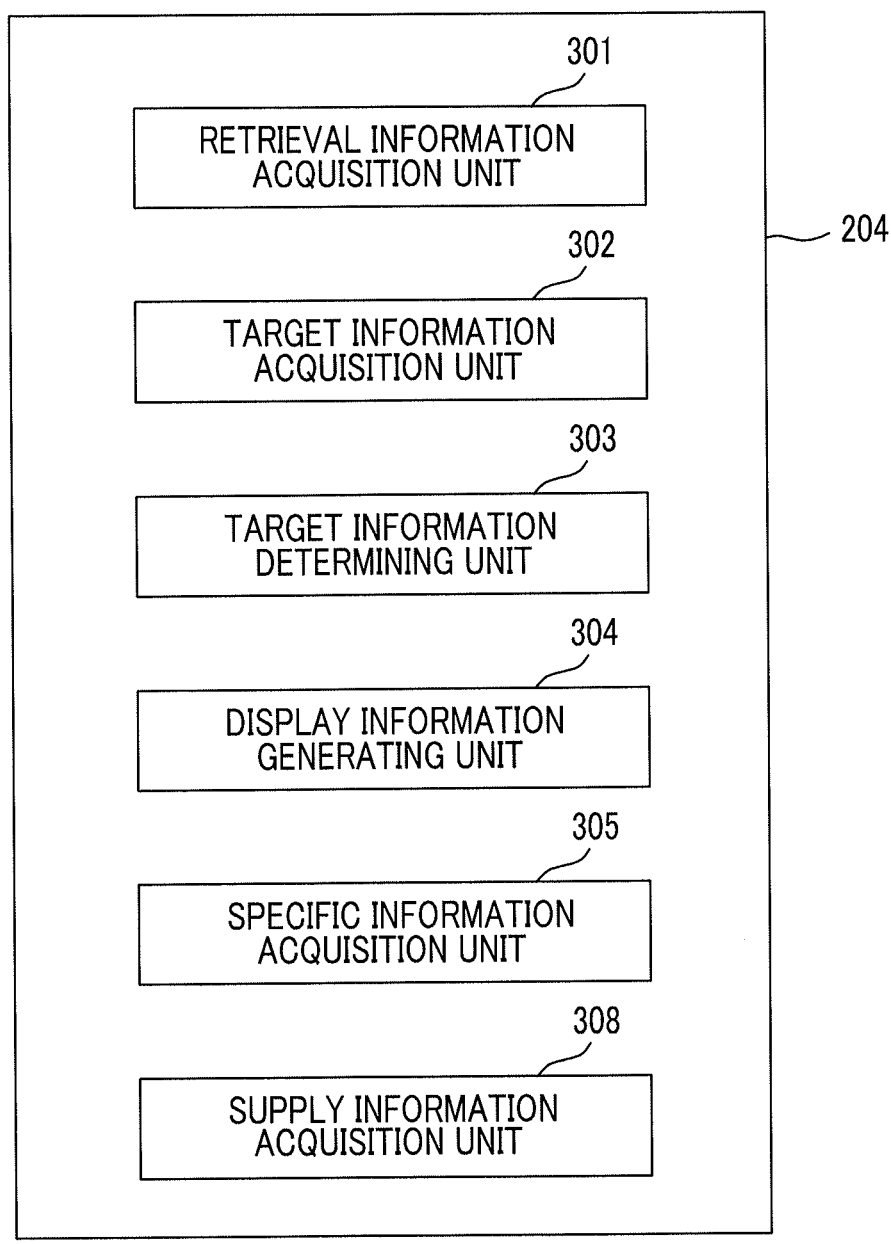
FIG. 12 is a diagram illustrating an example of a functional configuration of a registration destination determining unit according to a fifth exemplary embodiment.

FIG. 12 is a diagram illustrating an example of a functional configuration of the registration destination determining unit 204 according to this exemplary embodiment. As illustrated in FIG. 12, the registration destination determining unit 204 of this exemplary embodiment includes a supply information acquisition unit 308 in addition to the retrieval information acquisition unit 301, the target information acquisition unit 302, the target information determining unit 303, the display information generating unit 304, and the specific information acquisition unit 305.

The supply information acquisition unit 308 acquires the supply information included in the image information transmitted from the image processing device 110. Specifically, for example, the image processing device 110 determines whether a document is placed on an automatic document supply device, and the determination result is transmitted to the image information registration device 120 in correlation with the image information. Moreover, the supply information acquisition unit 308 acquires the supply information correlated with the image information.

The retrieval information acquisition unit 301 acquires the retrieval information stored in correlation with the rotation angle information and the surface identification information from the retrieval information storage unit 208 based on the rotation angle information acquired by the rotation angle information acquisition unit 203 and the supply information acquired by the supply information acquisition unit 308.

Here, in this exemplary embodiment, the retrieval information storage unit 208 stores the supply information in correlation in addition to the rotation angle information, the attribute information, and the association system information. FIG. 13 is a diagram illustrating an example of the retrieval information stored in the retrieval information storage unit 208. The information indicated by DADF/platen in FIG. 13 corresponds to the supply information. Specifically, DADF represents a case where documents are supplied from an automatic document supply device, and platen represents a case where documents are read by being placed on a platen.

In the case illustrated in FIG. 13, and DADF is acquired as the supply information, and 0° is acquired by the rotation angle information acquisition unit 203, the retrieval information acquisition unit 301 acquires the retrieval attribute name of name, the retrieval attribute value of specification folder, and the association system information of the document management system 140 as the retrieval information.

The other features are the same as those of the first exemplary embodiment, and description thereof will not be provided. The invention is not limited to the above exemplary embodiment, and the configuration illustrated in the exemplary embodiment can be substituted with a configuration substantially the same as the configuration illustrated in the exemplary embodiment, a configuration that realizes the same operational effects, or a configuration capable of achieving the same objects. For example, the first to fifth exemplary embodiments may be combined unless the exemplary embodiments are contradictory to each other. Moreover, in the first to fifth exemplary embodiments, although a case where two items of attribute information of the retrieval attribute name and the retrieval attribute value are used as the attribute information has been described, another number of items of attribute information may be used. Further, in the first to fifth exemplary embodiments, although a case where a document as a paper medium is read has been mainly described, other media may be used.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image information registration system comprising:
   an image information acquisition unit that acquires image information appearing on a surface of a medium by optically reading the surface of the medium;
   a rotation angle information acquisition unit that acquires rotation angle information corresponding to a rotation angle of the medium with respect to a reading direction of the image information acquisition unit based on the image information;
   a retrieval information acquisition unit that acquires retrieval information including at least one item of attribute information and association system information that represents an association system which are correlated with the rotation angle information based on the acquired rotation angle information;
   a target information acquisition unit that acquires one or a plurality of items of target information stored in the association system identified by the association system information according to the acquired retrieval information; and
   an image information registration unit that registers the image information according to the acquired one or plurality of items of target information.

2. The image information registration system according to claim 1, further comprising:
   a target information display unit that displays the acquired one or plurality of items of target information, wherein
   the image information registration unit registers the image information based on target information selected among the one or plurality of items of target information.

3. The image information registration system according to claim 2, wherein
   the image information registration unit registers the image information in a folder identified by the selected target information.

4. The image information registration system according to claim 1, further comprising:
   a medium supply unit that sequentially supplies a plurality of media to the image information acquisition unit.

5. The image information registration system according to claim 2, further comprising:
   a medium supply unit that sequentially supplies a plurality of media to the image information acquisition unit.

6. The image information registration system according to claim 3, further comprising:
   a medium supply unit that sequentially supplies a plurality of media to the image information acquisition unit.

7. The image information registration system according to claim 4, further comprising:
   a surface determining unit that determines whether the surface of the medium read by the image information acquisition unit is a first surface of the medium or a second surface thereof, wherein
   the retrieval information is further correlated with surface information that represents the first surface or the second surface, and
   the retrieval information acquisition unit acquires the retrieval information based on the acquired rotation angle information and a determination result of the surface determining unit.

8. The image information registration system according to claim 5, further comprising:
   a surface determining unit that determines whether the surface of the medium read by the image information acquisition unit is a first surface of the medium or a second surface thereof, wherein
   the retrieval information is further correlated with surface information that represents the first surface or the second surface, and
   the retrieval information acquisition unit acquires the retrieval information based on the acquired rotation angle information and a determination result of the surface determining unit.

9. The image information registration system according to claim 6, further comprising:
   a surface determining unit that determines whether the surface of the medium read by the image information acquisition unit is a first surface of the medium or a second surface thereof, wherein
   the retrieval information is further correlated with surface information that represents the first surface or the second surface, and
   the retrieval information acquisition unit acquires the retrieval information based on the acquired rotation angle information and a determination result of the surface determining unit.

10. The image information registration system according to claim 1, further comprising:
    a user identification information acquisition unit that acquires user identification information for identifying a user, wherein
    the retrieval information is further correlated with the user identification information, and
    the retrieval information acquisition unit acquires the retrieval information based on the acquired rotation angle information and the acquired user identification information.

11. The image information registration system according to claim 2, further comprising:
    a user identification information acquisition unit that acquires user identification information for identifying a user, wherein
    the retrieval information is further correlated with the user identification information, and
    the retrieval information acquisition unit acquires the retrieval information based on the acquired rotation angle information and the acquired user identification information.

12. The image information registration system according to claim 3, further comprising:

a user identification information acquisition unit that acquires user identification information for identifying a user, wherein the retrieval information is further correlated with the user identification information, and the retrieval information acquisition unit acquires the retrieval information based on the acquired rotation angle information and the acquired user identification information.

13. The image information registration system according to claim 4, further comprising:

a user identification information acquisition unit that acquires user identification information for identifying a user, wherein the retrieval information is further correlated with the user identification information, and the retrieval information acquisition unit acquires the retrieval information based on the acquired rotation angle information and the acquired user identification information.

14. The image information registration system according to claim 5, further comprising:

a user identification information acquisition unit that acquires user identification information for identifying a user, wherein the retrieval information is further correlated with the user identification information, and the retrieval information acquisition unit acquires the retrieval information based on the acquired rotation angle information and the acquired user identification information.

15. The image information registration system according to claim 6, further comprising:

a user identification information acquisition unit that acquires user identification information for identifying a user, wherein the retrieval information is further correlated with the user identification information, and the retrieval information acquisition unit acquires the retrieval information based on the acquired rotation angle information and the acquired user identification information.

16. The image information registration system according to claim 7, further comprising:

a user identification information acquisition unit that acquires user identification information for identifying a user, wherein the retrieval information is further correlated with the user identification information, and the retrieval information acquisition unit acquires the retrieval information based on the acquired rotation angle information and the acquired user identification information.

17. The image information registration system according to claim 8, further comprising:

a user identification information acquisition unit that acquires user identification information for identifying a user, wherein the retrieval information is further correlated with the user identification information, and the retrieval information acquisition unit acquires the retrieval information based on the acquired rotation angle information and the acquired user identification information.

18. The image information registration system according to claim 4, further comprising:

a supply information acquisition unit that acquires supply information that determines whether the medium read by the image information acquisition unit is a medium supplied by the medium supply unit, wherein the retrieval information is further correlated with the supply information, and the retrieval information acquisition unit acquires the retrieval information based on the acquired rotation angle information and the acquired supply information.

19. A non-transitory computer readable medium storing an image information registration program for causing a computer system to function as:

an image information acquisition unit that acquires image information appearing on a surface of a medium by optically reading the surface of the medium;

a rotation angle information acquisition unit that acquires rotation angle information corresponding to a rotation angle of the medium with respect to a reading direction of the image information acquisition unit based on the image information;

a retrieval information acquisition unit that acquires retrieval information including at least one item of attribute information and association system information that represents an association system which are correlated with the rotation angle information based on the acquired rotation angle information;

a target information acquisition unit that acquires one or a plurality of items of target information stored in the association system identified by the association system information according to the acquired retrieval information; and an image information registration unit that registers the image information according to the acquired one or plurality of items of target information.

20. An image information registration method comprising:

acquiring image information appearing on a surface of a medium by optically reading the surface of the medium;

acquiring rotation angle information corresponding to a rotation angle of the medium with respect to a reading direction of the medium based on the image information;

acquiring retrieval information including at least one item of attribute information and association system information that represents an association system which are correlated with the rotation angle information based on the acquired rotation angle information;

acquiring one or a plurality of items of target information stored in the association system identified by the association system information according to the acquired retrieval information; and registering the image information according to the acquired one or plurality of items of target information.

* * * * *